(12) United States Patent
Kraewer et al.

(10) Patent No.: US 12,352,654 B2
(45) Date of Patent: Jul. 8, 2025

(54) METHOD FOR DIAGNOSING AN EXHAUST COMPONENT IN AN EXHAUST PASSAGE FOR AN INTERNAL COMBUSTION ENGINE OF A VEHICLE

(71) Applicant: Robert Bosch GmbH, Stuttgart (DE)

(72) Inventors: Bernd Kraewer, Winnenden (DE); Maik Unverricht, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 127 days.

(21) Appl. No.: 18/060,017

(22) Filed: Nov. 30, 2022

(65) Prior Publication Data

US 2023/0184625 A1    Jun. 15, 2023

(30) Foreign Application Priority Data

Dec. 9, 2021   (DE) ...................... 10 2021 214 026.2

(51) Int. Cl.
  *G01M 15/10*   (2006.01)
  *F01N 11/00*   (2006.01)

(52) U.S. Cl.
  CPC ......... *G01M 15/102* (2013.01); *F01N 11/002* (2013.01); *F01N 11/007* (2013.01)

(58) Field of Classification Search
  CPC .. G01M 15/102; F01N 11/002; F01N 11/007; F01N 3/2066; F01N 2550/02; F01N 2560/021; F01N 2560/022; F01N 2560/023; F01N 2560/026; F01N 2570/12; F01N 2570/14; F01N 2570/18; F01N 2900/08; F01N 2900/1402; F01N 2900/1602; F01N 2900/1621; F01N 11/00
  See application file for complete search history.

(56) References Cited

U.S. PATENT DOCUMENTS

| | | | |
|---|---|---|---|
| 10,914,221 B2 * | 2/2021 | Hasslacher | F01N 11/00 |
| 2003/0010016 A1 * | 1/2003 | Beer | F02D 41/146 |
| | | | 60/276 |

(Continued)

FOREIGN PATENT DOCUMENTS

| | | | | |
|---|---|---|---|---|
| AT | 522635 A1 * | 12/2020 | | G01M 17/00 |
| DE | 102019129525 A1 * | 2/2020 | | G09B 29/102 |

*Primary Examiner* — Matthew T Largi
(74) *Attorney, Agent, or Firm* — NORTON ROSE FULBRIGHT US LLP

(57) ABSTRACT

A method for diagnosing an exhaust component in an exhaust passage for an internal combustion engine of a vehicle. In the method, operating parameters of the internal combustion engine are monitored and recorded by a control unit while the internal combustion engine is running. If a predefined emission threshold for the exhaust component for compliance with emissions is found to have been exceeded, the current operating parameters of the internal combustion engine are stored in a control unit. The operating state of the internal combustion engine when the predefined emission threshold is exceeded is reproduced on a vehicle test bench using the stored operating parameters. The diagnosis of the exhaust component is carried out based on a comparison between the current measured value from the exhaust component and the current measured value from an emission measuring device and/or the predefined emission threshold.

9 Claims, 2 Drawing Sheets

(56) References Cited

U.S. PATENT DOCUMENTS

| | | | |
|---|---|---|---|
| 2004/0211950 A1* | 10/2004 | Springett | B66C 11/18 |
| | | | 254/334 |
| 2007/0088472 A1* | 4/2007 | Ganzhorn | G01M 15/102 |
| | | | 701/31.4 |
| 2016/0341142 A1* | 11/2016 | Taibi | F02D 9/06 |
| 2018/0335370 A1* | 11/2018 | Maschmeyer | G01M 17/007 |
| 2019/0041295 A1* | 2/2019 | Pfister | G01M 13/02 |
| 2019/0226383 A1* | 7/2019 | Hasslacher | F01N 11/00 |
| 2020/0232363 A1* | 7/2020 | Zhang | F01N 9/00 |

\* cited by examiner

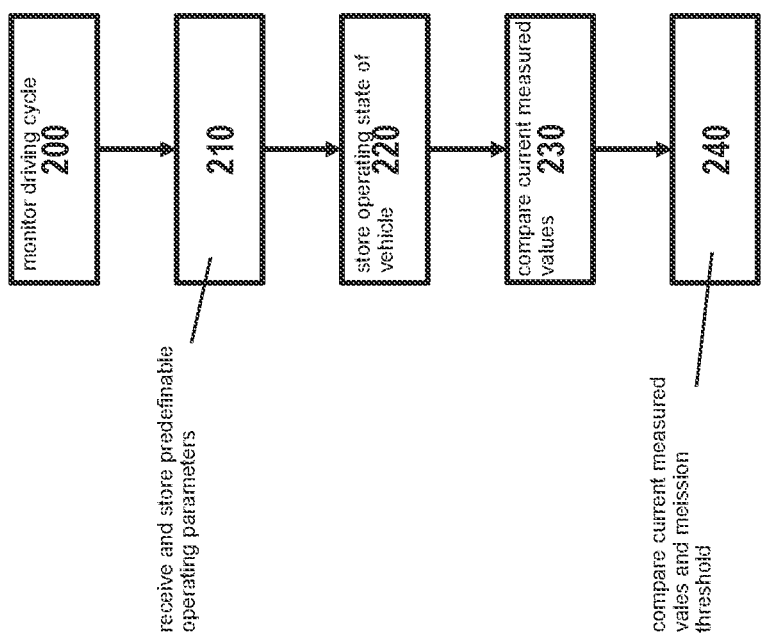

METHOD FOR DIAGNOSING AN EXHAUST COMPONENT IN AN EXHAUST PASSAGE FOR AN INTERNAL COMBUSTION ENGINE OF A VEHICLE

CROSS REFERENCE

The present application claims the benefit under 35 U.S.C. § 119 of German Patent Application No. DE 10 2021 214 026.2 filed on Dec. 9, 2021, which is expressly incorporated herein by reference in its entirety.

BACKGROUND INFORMATION

Where exhaust components such as catalytic converters or sensors are used for the aftertreatment of exhaust gases from internal combustion engines, the legislation in the various target markets lays down requirements concerning the monitoring of the components. The aim of these requirements is to ensure the proper functioning of the components.

In the context of the planned tightening of exhaust gas legislation in Europe (Euro 7), a new type of exhaust gas monitoring known as OBM (on-board monitoring) is also under discussion.

The basic concept behind OBM is the monitoring of actual exhaust gas emissions in the vehicle.

SUMMARY

In a first aspect, the present invention relates to a method for diagnosing an exhaust component in an exhaust passage for an internal combustion engine of a vehicle. According to an example embodiment of the present invention, in the method, operating parameters of the internal combustion engine are monitored and recorded by a control unit while the internal combustion engine is running, in particular during a driving cycle of the vehicle, where, if a predefined emission threshold for the exhaust component for compliance with emissions is found to have been exceeded, preferably by a current measured value from the exhaust component, the current operating parameters of the internal combustion engine on exceeding the predefined emission threshold are stored in a control unit, the operating parameters characterizing an operating state of the internal combustion engine when the emissions are exceeded, wherein the operating state of the internal combustion engine when the predefined emission threshold is exceeded is reproduced on a vehicle test bench using the stored operating parameters, and the diagnosis of the exhaust component is carried out based on a comparison between the current measured value from the exhaust component and the current measured value from an emission measuring device and/or the predefined emission threshold.

The method offers the particular advantage that if excess emissions from an exhaust component in the exhaust passage of the internal combustion engine are detected during a driving cycle, the operating state of the vehicle is recorded in such a way that this operating state at which the emissions were exceeded may be reproduced exactly or almost exactly at a later time on a vehicle test bench, for example in a workshop, in order to perform a diagnosis or pinpointing for the identified exhaust component.

To this end, when the vehicle is running on the vehicle test bench, an emission measuring device, preferably a portable emission measurement system (PEMS), which is able to use a sensor or sensor-based models to obtain the same measured variable as that of the identified exhaust component, is advantageously installed at the exhaust outlet. By comparing the current measured values from the exhaust component and the current measured values from the emission measuring device in the reproduced operating state, it is possible to perform a diagnosis of the exhaust component.

The method thus allows for a subsequent check of the exhaust component under predefined conditions, such that it is possible to establish whether an exhaust component is defective or in order.

In a particular example embodiment of the present invention, the exhaust component may be deemed to be defective if the current measured value from the exhaust component exceeds the current measured value from the emission measuring device. Since it is assumed that the current measured values from the emission measuring device are valid, then if the current measured values from the exhaust component deviate too greatly from the current measured values from the emission measuring device, the exhaust component may be diagnosed as defective. A robust diagnosis of a defect in the exhaust component may thus be made.

Moreover, the exhaust component may be deemed to be defective if the current measured value from the exhaust component agrees with the current measured value from the emission measuring device and the current measured value exceeds the predefined emission threshold.

If the current measured values from the exhaust component and the emission measuring device are identical or near-identical, but the current measured values exceed the stipulated emission threshold, a defect in the exhaust component is identified. In addition, an exhaust component that influences the exhaust component may also be defective.

In a further example embodiment of the present invention, the exhaust component may be deemed to be in order if the current measured value from the exhaust component agrees with the current measured value from the emission measuring device and the current measured value does not exceed the predefined emission threshold.

This is particularly advantageous, since the functional capacity of the exhaust component may be validated in a robust manner in this way, and therefore the exhaust component is not replaced unnecessarily.

In a particular example embodiment of the present invention, the operating parameters may correspond to a mass flow rate and/or an item of load information and/or an engine speed and/or a catalytic converter temperature and/or an air-fuel ratio and/or nitrogen oxide measurement and/or catalytic converter loading.

The operating parameters may be used in a robust and simple manner to characterize an operating state when emission levels are exceeded, in order to be able to reproduce this operating state subsequently, for example on a vehicle test bench.

Moreover, according to an example embodiment of the present invention, the emission measuring device is arranged at the outlet of an exhaust passage of the internal combustion engine.

Furthermore, the at least one emission measuring device may correspond to a portable emission measurement system (PEMS).

According to an example embodiment of the present invention, it is particularly advantageous if the current measured values from the exhaust component and from the emission measuring device correspond to a measured value for nitrogen oxide and/or nitrogen dioxide and/or an air-fuel ratio and/or soot particles and/or ammonia (NH3) and/or carbon monoxide (CO) and/or dinitrogen monoxide (N2O) and/or hydrocarbons (HC) and/or CH4 methane (CH4).

In further aspects, the present invention relates to a device, particularly a control unit, and a computer program, which are equipped, in particular programmed, to carry out one of the methods. In a further aspect, the present invention relates to a machine-readable storage medium on which the computer program is stored.

BRIEF DESCRIPTION OF THE DRAWINGS

The present invention is described in more detail below by reference to an exemplary embodiment presented in the figures.

FIG. 2 shows a schematic flow chart of a first example of an embodiment of the diagnosis, according to the present invention, of an exhaust component in the exhaust passage for an internal combustion engine of a vehicle.

DETAILED DESCRIPTION OF EXAMPLE EMBODIMENTS

Figure 1:
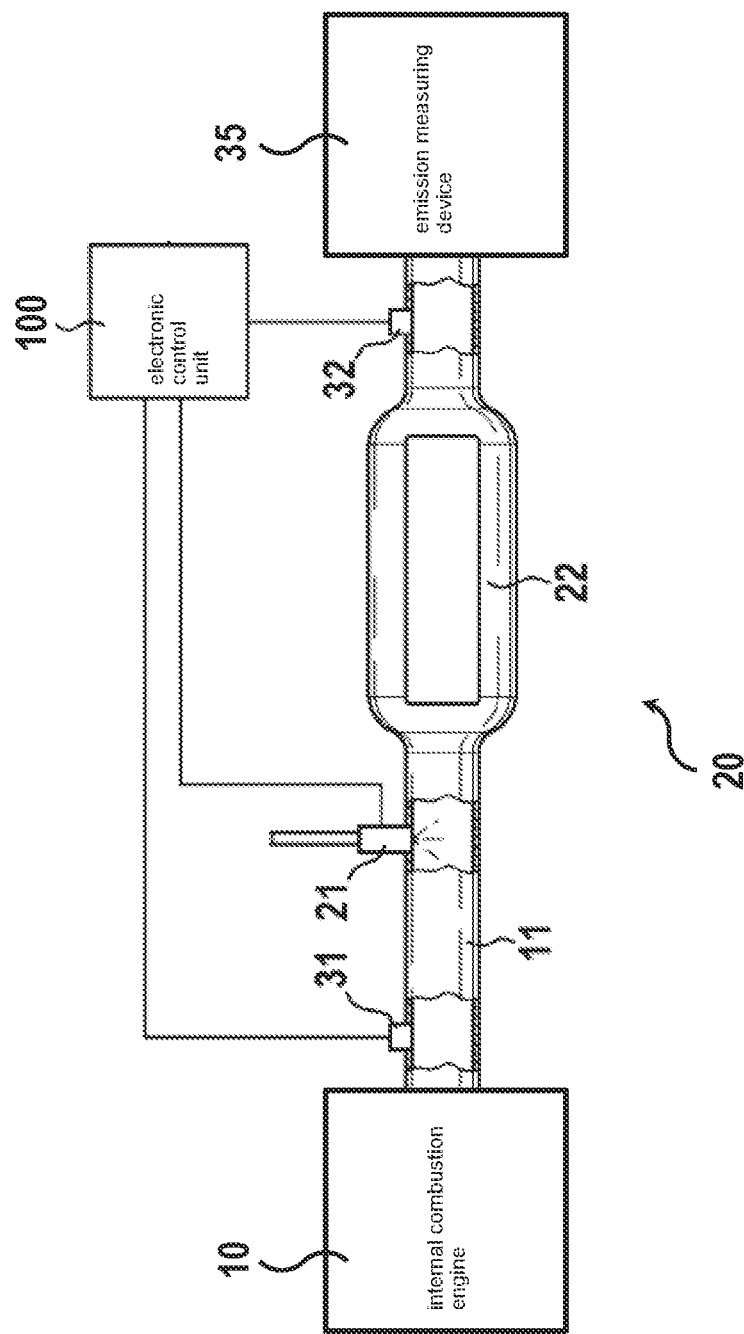
FIG. 1 shows a schematic view of an exhaust passage of an internal combustion engine having at least one exhaust component to be diagnosed, according to an example embodiment of the present invention.

An internal combustion engine 10 has in its exhaust passage 11 an SCR system 20, which is illustrated in FIG. 1. Said system has a reducing agent dosing unit 21, with which an aqueous urea solution (AdBlue) may be injected into exhaust passage 11.

Ammonia is released from said solution at high exhaust gas temperatures. An SCR catalytic converter 22 is arranged downstream of reducing agent dosing unit 21. Further SCR catalytic converters may be arranged downstream of SCR catalytic converter 22. A first NOx sensor 31 is arranged upstream of reducing agent dosing unit 21 and downstream of an internal combustion engine 10 in exhaust passage 11. First NOx sensor 31 measures a first NOx signal, preferably as an NOx concentration or as an NOx mass flow rate. A second NOx sensor 32 is arranged downstream of first SCR catalytic converter 22 and measures a second NOx signal. All NOx sensors 31, 32 relay their signals to an electronic control unit 100. Moreover, first and second NOx sensors 31, 32 may be designed in such a way that as well as ascertaining an NOx concentration, a lambda signal may also be ascertained.

As well as responding to nitrogen oxides, NOx sensors 31, 32 are also cross-sensitive to ammonia, so their signals are summed signals of nitrogen oxides and ammonia. However, first NOx sensor 31 is arranged upstream of reducing agent dosing unit 21, so it reliably measures only the amount of nitrogen oxide in the exhaust gas. Reducing agent dosing unit 21 likewise relays the amount of ammonia dosed into exhaust passage 11 to control unit 100.

Furthermore, an efficiency model that is calculated in control unit 100 ascertains an NOx conversion rate or an efficiency for the SCR catalytic converter when converting nitrogen oxides and provides an aqueous urea solution dosing strategy that is stored in control unit 100.

The efficiency model may be designed here as a reaction kinetic model or as a characteristic diagram, the efficiency model being ascertained in a conventional manner as a function of a temperature for SCR catalytic converter 22, a urea dosing quantity, an exhaust gas mass flow rate, and the first NOx signal upstream of SCR catalytic converter 22.

At the outlet of exhaust passage 11 there is arranged an emission measuring device 35, which may be mounted on a trailer coupling on the vehicle. Portable emission measuring device 35 is preferably only mounted on the vehicle on a vehicle test bench.

The current emissions generated by internal combustion engine 10 may be measured by way of emission measuring device 35. Emission measuring device 35 may preferably be designed in this case as a portable emission measurement system (PEMS).

Emission measuring device 35 may be used to ascertain emissions from internal combustion engine 10 when the car is driven in real conditions (Real Driving Emissions (RDE)). To this end, emission measuring device 35 is equipped with a plurality of exhaust gas sensors, and is preferably able to measure nitrogen oxide emissions (NOx), carbon monoxide emissions (CO) and particle emissions, lambda signal, etc.

Moreover, internal combustion engine 10 has a fresh air passage or air intake passage, not shown in any further detail, in which a mass air flow sensor, such as, for example, a hot-film air mass sensor (HFM), a throttle valve for controlling air supplied to internal combustion engine 10, is preferably arranged.

The speed of internal combustion engine 10 is preferably ascertained by the crankshaft sensor.

Information about the fuel injection quantity, camshaft adjustment, temperatures in the intake passage, temperatures of the internal combustion engine, and temperatures in the exhaust passage, is provided in the usual way to electronic control unit 100. This information may be ascertained using temperature sensors, or by way of models calculated in control unit 100.

Control unit 100 monitors the emissions generated by the vehicle using a plurality of sensor variables and the models ascertained in control unit 100. Thus, for example, using second NOx sensor 32 arranged downstream of SCR catalytic converter 22 it is possible to ascertain the NOx concentration $AK_{act}$ at the location of NOx sensor 32. The emission limits stored in control unit 100 may thus be monitored. If, for example, a predefinable NOx concentration $S_{NOx}$ at the location of second NOx sensor 32 is exceeded for a predefinable time, an error may be diagnosed for second NOx sensor 32 or for other exhaust components.

Internal combustion engine 10 may preferably be a gasoline, diesel or gas internal combustion engine or a hydrogen internal combustion engine. The method is transferable to any exhaust passage arrangement for which a measured value and/or model, preferably calculated in control unit 100, are available for the components to be diagnosed. By comparing the current measured values from the exhaust component with a similar measured value from emission measuring device 35, a diagnosis of the exhaust component or a pinpointing for the exhaust component may be carried out in the context of predefined emission thresholds.

FIG. 2 illustrates an example of the operational sequence of the method for diagnosing an exhaust component in exhaust passage 11 for an internal combustion engine 10 of a vehicle.

The example described is limited to the diagnosis of an NOx sensor 32 as an exhaust component arranged downstream of SCR catalytic converter 22. However, the method may be applied without restriction to exhaust components in exhaust passage 11 for which a measured value or a modeled measured value is available for analysis.

In a first step 200, the driving cycle of the vehicle is monitored by control unit 100. To this end, the current measured value $AK_{act}$ from exhaust component 32, in the present example the NOx concentration from second NOx sensor 32, is monitored by control unit 100, preferably continuously or in a predefinable sampling interval of 1-100 ms.

If the current measured value $AK_{act}$ from exhaust component 32 exceeds a predefinable threshold $S_{AK}$, the method is continued in a step 210.

The predefinable threshold $S_{AK}$ preferably corresponds here to a threshold for exhaust component 32 to be diagnosed that constitutes a violation of the statutory emissions legislation, e.g., Euro 7. This threshold $S_{AK}$ is preferably applied and stored in an application phase for the corresponding exhaust component in control unit 100.

In a preferred embodiment, the exceeding of the predefinable threshold $S_{AK}$ may be delayed, preferably by filtering.

In an alternative embodiment, a prediction for a possible exceeding of the predefinable threshold $S_{AK}$ may be made by way of a monitoring function for exhaust component 32 or for the measured value $AK_{act}$ that characterizes exhaust component 32, calculated in control unit 100.

To this end, the current measured value $AK_{act}$ from exhaust component 32 is recorded in control unit 100, preferably over a predefinable period of time, and a prediction for the measured value from exhaust component 32 is ascertained by control unit 100 on the basis of the recorded measured values.

If it is ascertained that the predicted measured value from exhaust component 32 will exceed the predefinable threshold $S_{AK}$, the method is continued in step 210.

In a step 210, predefinable operating parameters for internal combustion engine 10, which characterize the prevailing operating state when the predefinable threshold $S_{AK}$ is exceeded by the current measured value $AK_{act}$ from exhaust component 32, are received and stored by control unit 100. To this end, operating parameters such as the mass flow rate for internal combustion engine 10 and/or load information for internal combustion engine 10 and/or the engine speed $n_{eng}$ and/or catalytic converter temperatures and/or temperatures of the air supplied to the engine and/or temperatures of the exhaust gas and/or the air-fuel ratio and/or NOx concentrations and/or the catalytic converter loading are preferably stored by control unit 100. These measured values are preferably ascertained and stored by control unit 100 using sensors or models calculated in control unit 100. These values are primarily operating variables of internal combustion engine 10 with which the prevailing operating state for internal combustion engine 10 in the driving cycle may be reproduced as closely as possible or in a similar manner on a vehicle test bench, preferably in a workshop, for internal combustion engine 10 of the vehicle.

The operating parameters may be recorded for a predefinable time or until internal combustion engine 10 is stopped or until the current measured value $AK_{act}$ no longer exceeds the predefinable threshold $S_{AK}$, in other words until the emissions are no longer exceeded.

The method is then continued in a step 220.

In a step 220, the operating state of the vehicle that is stored when the predefinable threshold $S_{AK}$ is exceeded is reproduced on a vehicle test bench by setting the recorded operating parameters. In addition, an emission measuring device 35 is attached to the vehicle or at the outlet of exhaust passage 11 of the vehicle. As described in the introductory section, emission measuring device 35 is equipped with at least with the same sensors as fitted in the vehicle, or with more sensors, or with other sensors for analyzing the exhaust gas of internal combustion engine 10.

Alternatively, the at least one sensor for emission measuring device 35 may also be a sensor that uses a different measuring principle to ascertain the same measured variable as the sensor installed in exhaust passage 11 to diagnose exhaust component 32.

Internal combustion engine 10 is operated in accordance with the recorded operating parameters and, in addition, the exhaust component to be diagnosed, i.e., in the present example, the current measured value $AK_{act}$ from second NOx sensor 32 and the current measured value $EV_{act}$ from emission measuring device 35, is received and stored by control unit 100. In this specific example, emission measuring device 35 is equipped with an NOx sensor and thus, like second NOx sensor 32, is able to ascertain an NOx concentration in the exhaust gas.

On completion of the reproduction of the operating state for the vehicle using the recorded operating parameters, the method may be continued in a step 230.

In a step 230, a comparison is made between the current measured values $AK_{act,i}$ from second NOx sensor 32 stored or ascertained in step 220 and the current measured values $EV_{act,i}$ ascertained by emission measuring device 35.

In a preferred embodiment, a difference D may be calculated between the current measured values $EV_{act,i}$ ascertained by emission measuring device 35 and the current measured values $AK_{act,i}$ from second NOx sensor 32. If the difference D that is ascertained exceeds a predefinable upper threshold $S_{max}$ or if the difference D is below a predefinable lower threshold $S_{min}$, second NOx sensor 32 is deemed to be defective.

Otherwise, the current measured values $AK_{act,i}$ ascertained by second NOx sensor 32 are considered valid.

In an alternative embodiment, a quotient Q may be calculated between the current measured values $AK_{act,i}$ ascertained by second NOx sensor 32 and the current measured values $EV_{act,i}$ ascertained by emission measuring device 35:

$$Q_i = \frac{AK_{act,i}}{EV_{act,i}}.$$

If the quotient $Q_i$ is below a predefinable threshold $S_Q$, preferably a value of 0.9, second NOx sensor 32 is deemed to be defective.

If the quotient $Q_i$ is not below the predefinable threshold $S_Q$, the current measured values $AK_{act,i}$ ascertained by second NOx sensor 32 are considered valid.

In a preferred embodiment, a mean value may be calculated from the current measured values $AK_{act,i}$ ascertained by second NOx sensor 32 and the current measured values $EV_{act,i}$ ascertained by emission measuring device 35.

The method may then be continued in a step 240.

In addition, if a defect is found in exhaust component 32, a check engine light in the instrument panel of the vehicle may be activated.

In a step 240, if the current measured values AK ascertained by second NOx sensor 32 are considered valid, a comparison is made between the ascertained current measured values $AK_{act,i}$ and the emission threshold $S_{NOx}$. The emission threshold $S_{NOx}$ that is used here is preferably stored in an application phase for the permitted NOx concentration in control unit 100. This corresponds to a threshold that was preferably ascertained on the basis of emissions legislation, e.g., Euro 7 or CARB, and is stored in control unit 100 to ensure compliance with the emissions legislation.

If the current measured values $AK_{act,i}$ exceed the predefinable emission threshold $S_{NOx}$ second NOx sensor 32 is deemed to be defective.

In an alternative embodiment, a defect may also be identified in an exhaust component that is physically associated with second NOx sensor 32.

The method may then be concluded.

In an alternative embodiment, the method presented here may also be applied to modeled variables calculated in control unit 100, ascertained as a function of sensor values or of variables derived from sensor values, for example.

What is claimed is:

1. A method for diagnosing an exhaust component in an exhaust passage for an internal combustion engine of a vehicle, the method comprising the following steps:

while the internal combustion engine is running during a driving cycle of the vehicle:
generating, by the exhaust component, measurement values of an emission parameter;
comparing, by a control unit, the values generated by the exhaust component to a predefined emissions compliance threshold; and
responsive to a result of the comparison being that the predefined emissions compliance threshold has been exceeded by a respective one of the generated values generated by the exhaust component, storing current operating parameters of the internal combustion engine at a time of the exceedance and/or during a period immediately following the exceedance, the stored operating parameters thereby characterizing an operating state of the internal combustion engine at the time of the exceedance;

reproducing the characterized operating state of the internal combustion engine on a vehicle test bench using the stored operating parameters;

recording, using the vehicle test bench, a simulation value of the emission parameter resulting from the reproduced characterized operating state; and carrying out the diagnosis of the exhaust component based on a comparison between the simulation value and the respective one of the generated values previously generated by the exhaust component.

2. The method as recited in claim 1, wherein the exhaust component is deemed to be defective when the respective one of the generated values previously generated by the exhaust component exceeds the simulation value.

3. The method as recited in claim 1, wherein the exhaust component is deemed to be in order at least when the respective one of the generated values previously generated by the exhaust component agrees with the simulation value and does not exceed the predefined emissions compliance threshold.

4. The method as recited in claim 1, wherein the current operating parameters correspond to a mass flow rate and/or an item of load information and/or an engine speed and/or a catalytic converter temperature and/or an air-fuel ratio and/or nitrogen oxide measurement and/or catalytic converter loading.

5. The method as recited in claim 1, wherein an emission measuring device of the vehicle test bench that provides the simulation value is arranged at an outlet of an exhaust passage of the internal combustion engine.

6. The method as recited in claim 1, wherein a portable emission measurement system is used for measuring the simulation value generated by the vehicle test bench.

7. The method as recited in claim 1, wherein the values of the emission parameter generated by the exhaust component and the simulation value are measurements of nitrogen oxide and/or nitrogen dioxide and/or an air-fuel ratio and/or soot particles and/or ammonia (NH3) and/or carbon monoxide (CO) and/or dinitrogen monoxide (N2O) and/or hydrocarbons (HC) and/or CH4 methane (CH4).

8. A non-transitory machine-readable storage medium on which is stored a computer program for diagnosing an exhaust component in an exhaust passage for an internal combustion engine of a vehicle, the computer program, when executed by a computer, causing the computer to perform the following steps:

while the internal combustion engine is running during a driving cycle of the vehicle:
obtaining measurement values of an emission parameter generated by the exhaust component;
comparing the values generated by the exhaust component to a predefined emissions compliance threshold;
responsive to a result of the comparison being that the predefined emissions compliance threshold has been exceeded by a respective one of the generated values generated by the exhaust component, storing current operating parameters of the internal combustion engine at a time of the exceedance and/or during a period immediately following the exceedance, the stored operating parameters thereby characterizing an operating state of the internal combustion engine at the time of the exceedance;

obtaining a simulation value of the emission parameter generated by a vehicle test bench, resulting from a reproduction, using the stored operating parameters, of the characterized operating state of the internal combustion engine;

carrying out the diagnosis of the exhaust component based on a comparison between the simulation value and the respective one of the generated values previously generated by the exhaust component; and activating a check engine light of an instrument panel of the vehicle in response to the diagnosis.

9. An electronic control unit configured to diagnose an exhaust component in an exhaust passage for an internal combustion engine of a vehicle, the electronic control unit configured to:

while the internal combustion engine is running during a driving cycle of the vehicle:
obtain measurement values of an emission parameter generated by the exhaust component;
compare the values generated by the exhaust component to a predefined emissions compliance threshold; and
responsive to a result of the comparison being that the predefined emissions compliance threshold has been exceeded by a respective one of the generated values generated by the exhaust component, store current operating parameters of the internal combustion engine at a time of the exceedance and/or during a period immediately following the exceedance, the stored operating parameters thereby characterizing an operating state of the internal combustion engine at the time of the exceedance;

obtain a simulation value of the emission parameter generated by a vehicle test bench, resulting from a reproduction, using the stored operating parameters, of the characterized operating state of the internal combustion engine;

carry out the diagnosis of the exhaust component based on a comparison between the simulation value and the respective one of the generated values previously generated by the exhaust component; and activate a check engine light of an instrument panel of the vehicle in response to the diagnosis.

* * * * *